US009948373B2

(12) United States Patent
Cassiau

(10) Patent No.: US 9,948,373 B2
(45) Date of Patent: Apr. 17, 2018

(54) MIMO-FBMC TRANSMITTER/RECEIVER WITH LINEAR PRECODING IMPLEMENTED IN THE FREQUENCY DOMAIN

(71) Applicant: COMMISSARIAT A L'ENERGIE ATOMIQUE ET AUX ENERGIES ALTERNATIVES, Paris (FR)

(72) Inventor: Nicolas Cassiau, Saint Etienne de Crossey (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/592,535

(22) Filed: May 11, 2017

(65) Prior Publication Data

US 2017/0331536 A1    Nov. 16, 2017

(30) Foreign Application Priority Data

May 13, 2016  (FR) ...................................... 16 54298

(51) Int. Cl.
*H04B 7/02*     (2017.01)
*H04B 7/0456*   (2017.01)
*H04L 27/26*    (2006.01)

(52) U.S. Cl.
CPC ......... *H04B 7/0456* (2013.01); *H04L 27/264* (2013.01); *H04L 27/2628* (2013.01); *H04L 27/2698* (2013.01)

(58) Field of Classification Search
CPC ............... H04L 27/264; H04L 27/2698; H04L 27/2631; H04L 25/022; H04L 1/0668; H04L 1/0625; H04L 5/0007; H04L 25/03343; H04L 27/2626; H04L 27/2647; H04L 27/2649; H04L 27/38; H04B 7/0413; H04B 7/0452
USPC ........................................ 375/260, 259, 295
See application file for complete search history.

(56) References Cited

U.S. PATENT DOCUMENTS

2013/0286959 A1* 10/2013 Lou ........................ H04W 72/04
                                                        370/329
2016/0065390 A1*  3/2016 Kim ..................... H04L 25/0224
                                                        375/260
2016/0080961 A1*  3/2016 Kim ....................... H04L 27/264
                                                        370/252

(Continued)

OTHER PUBLICATIONS

U.S. Appl. No. 15/454,721, filed Mar. 9, 2017, Nicolas Cassiau.

(Continued)

*Primary Examiner* — Leila Malek
(74) *Attorney, Agent, or Firm* — Oblon, McClelland, Maier & Neustadt, L.L.P.

(57) ABSTRACT

The invention relates to a MIMO-FBMC transmitter/receiver with linear precoding implemented in the frequency domain. In one embodiment, at the transmitter the linear precoding is performed ($525_1, \ldots, 525_{KN}$) after filtering and spectral spreading, before the IFFT and combination of FBMC symbols in the time domain, such that the precoding does not introduce interference between data streams. In a second embodiment the linear precoding may be combined with the beamforming at transmission or at reception so as to spatially separate the data streams.

13 Claims, 10 Drawing Sheets

(56) References Cited

U.S. PATENT DOCUMENTS

2016/0211998 A1* 7/2016 Sun .................. H04L 27/264
2017/0134203 A1* 5/2017 Zhu .................. H04L 27/2614

OTHER PUBLICATIONS

French Preliminary Search Report dated Feb. 23, 2017 in French Application 16 54298 filed on May 13, 2016 (with English Translation of Categories of Cited Documents).
Botaro Hirosaki "An Orthogonally Multiplexed QAM System Using the Discrete Fourier Transform" IEEE Transactions on Communications, Jul. 1981, pp. 8.
Pierre Siohan et al. "Analysis and Design of OFDM/OQAM Systems Based on Filterbank Theory" IEEE Transactions on Signal Processing, vol. 50, No. 5, May 2002, pp. 14.
Etienne Auger et al. "Time Domain Precoding for MIMO-OFDM Systems" $10^{th}$ International OFDM—Workshop, 2005, pp. 5.
Francois Horlin et al. "Interference-free SDMA for FBMC-OQAM" EURASIP Journal on Advances in Signal Processing, 2013, pp. 13.
M. Bellanger et al. "FBMC physical layer : a primer" PHYDYAS, Jan. 2010, pp. 31.
Francois Rottenberg et al., "Optimal Zero Forcing Precoder and Decoder Design for Multi-User MIMO FBMC Under Strong Channel Selectivity", 2016 IEEE International Conference on Acoustics, Speech and Signal Processing (ICASSP), 2016, pp. 5.
Amir Aminjavaheri et al., "Frequency spreading equalization in multicarrier massive MIMO", 2015 IEEE International Conference on Communication Workshop (ICCW), 2015, pp. 6.
Maurice Bellanger "FS-FBMC: a flexible robust scheme for efficient multicarrier broadband wireless access", 2012 IEEE Globecom Workshops, 2012, pp. 5.
Chrislin Lele et al., "The Alamouti Scheme with CDMA-OFDM/ OQAM" , EURASIP Journal on Advances in Signal Processing, 2010, pp. 13.

* cited by examiner

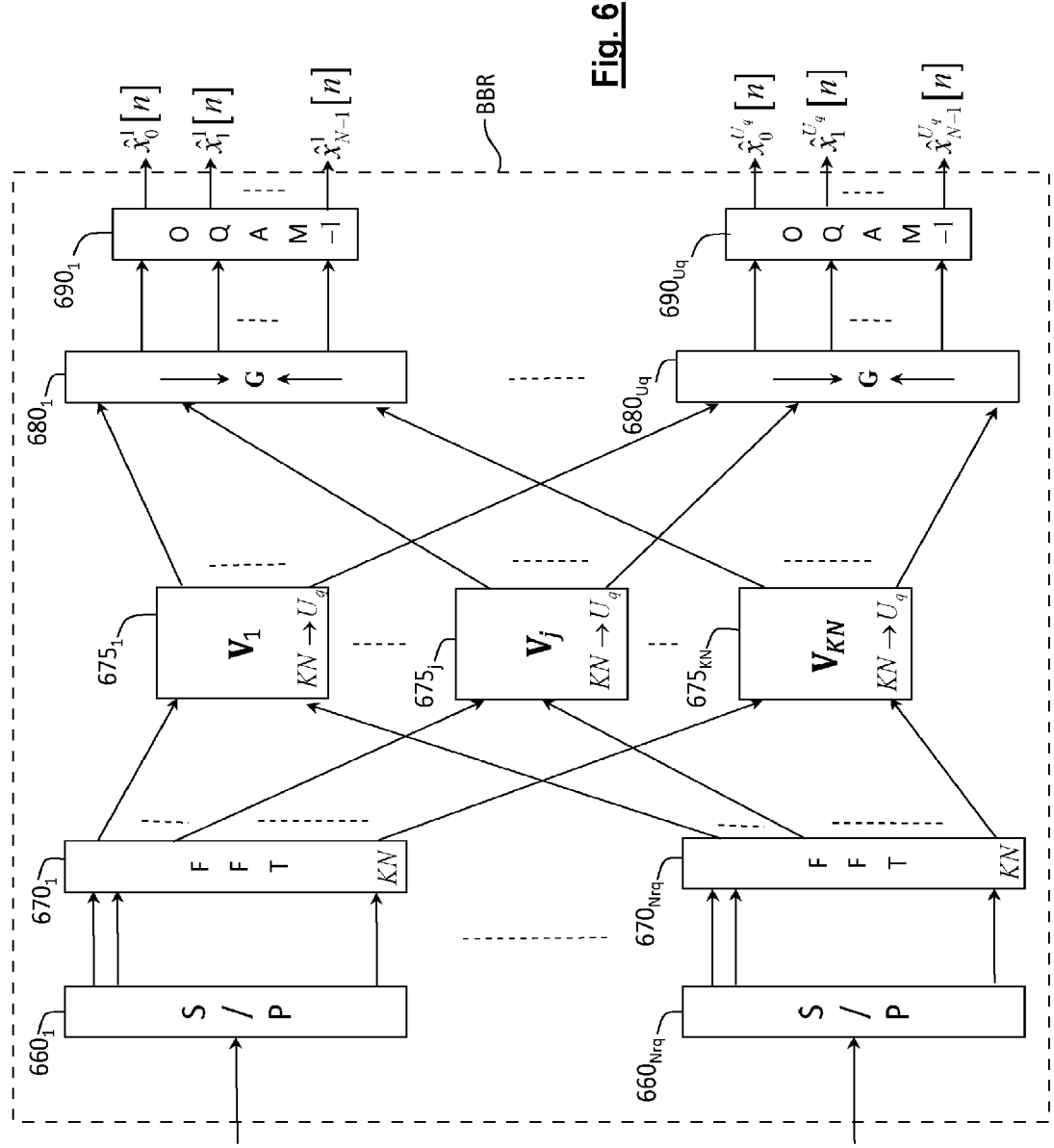

MIMO-FBMC TRANSMITTER/RECEIVER WITH LINEAR PRECODING IMPLEMENTED IN THE FREQUENCY DOMAIN

TECHNICAL DOMAIN

This invention relates in a general manner to the field of telecommunication systems using Filter Bank Multi-Carrier modulation, also called FBMC systems. It also relates to MIMO (Multiple Input Multiple Output) systems using precoding on transmission.

STATE OF PRIOR ART

Telecommunications systems using multi-carrier modulation are well known in the state of the art. The principle behind such modulation consists of dividing the transmission band into a plurality of frequency sub-channels associated with sub-carriers and modulating each of these sub-carriers with the data to be transmitted.

The most widespread multi-carrier modulation is undoubtedly OFDM (Orthogonal Frequency Division Multiplexing) modulation. OFDM modulation is not however an optimum solution for applications requiring high out-of-band rejection rates because the spectral occupancy of an OFDM signal is significantly larger than the band of sub-carriers that it uses due to spreading of secondary lobes.

FBMC (Filter Bank Multi Carrier) modulation is a multi-carrier modulation that can give better spectral positioning in the band of sub-carriers. It is also one of the possible solutions for fifth generation telecommunication systems.

The principle of FBMC modulation is based on synthesis by filter bank on transmission and analysis by filter bank on reception, with the product of the transfer function of a filter at transmission by the transfer function of the corresponding filter at reception being equal to the transfer function of the Nyquist filter.

FBMC systems are conventionally implemented in the time domain. The structure of an FBMC system implemented in the time domain has been described in detail in the article by B. Hirosaki entitled "An orthogonally multiplexed QAM system using the discrete Fourier transform" published in IEEE Trans on Comm., vol. 29 No. 7, pp. 982-989, July 1981, as well as in the article by P. Siohan et al. entitled "Analysis and design of OFDM/OQAM systems based on filterbank theory" published in IEEE Trans. on signal processing, vol. 50, No 5, pp. 1170-1183, May 2002. FBMC systems implemented in the time domain make use of networks of polyphase filters, hence their name PPN-FBMC (Polyphase network FBMC).

The principle of FBMC modulation is based on synthesis by a filter bank at transmission and analysis by a filter bank at reception as described in relation to FIG. 1.

FIG. 1 diagrammatically shows the structure of a first FBMC transmission/reception system known in the state of the art.

This structure has been described in detail in the article by B. Hirosaki entitled "An orthogonally multiplexed QAM system using the discrete Fourier transform" published in IEEE Trans on Comm., vol. 29 No. 7, pp. 982-989, July 1981, as well as in the article by P. Siohan et al. entitled "Analysis and design of OFDM/OQAM systems based on filterbank theory" published in IEEE Trans. on signal processing, vol. 50, No 5, pp. 1170-1183, May 2002.

At the transmitter the QAM modulation symbols to be transmitted at a rate Nf where f=1/T, are grouped into blocks of size N, $x_0[n], \ldots, x_{N-1}[n]$ where n is the block time index. Each block of N symbols is supplied in parallel to N input channels of a preprocessing module 110, so called OQAM (Offset QAM) preprocessing. The function of this preprocessing module is to demultiplex the real part and the imaginary part of input symbols with a frequency 2f such that of two samples transmitted at the same time on two successive sub-channels or of two samples transmitted at two successive instants on the same sub-channel one is real, and the other is purely imaginary. Each of the N output channels of the preprocessing module 110 corresponds to a sub-channel.

The samples thus obtained are supplied in the form of blocks of size N to a synthesis filter bank 120, composed of an IFFT (inverse fast Fourier transform) module of size N, 130, a plurality N of polyphase filters 133, a plurality of oversamplers 135 with factor M=N/2, at the output from the various polyphase filters, and finally a plurality of delays 137 arranged in parallel and varying from 0 to N−1 sampling periods. Each of the N processing channels corresponds to one sub-channel.

Outputs from polyphase, oversampled and delayed filters are summed by the adder 139 before translation to an RF frequency (not shown) and transmission on the channel 150.

The polyphase filters are versions translated in frequency of k/MT of a prototype filter for which the pulse response duration is KT, in other words the output from a polyphase filter overlaps the output from the adjacent polyphase filter in time by M samples. The result is that an output from the polyphase filter overlaps K other polyphase filter outputs in time. The coefficient is called the overlapping factor or interlacing factor for this reason.

At the receiver side after base-band demodulation, the received signal is sampled at a rate Nf. The samples are supplied in the form of blocks of size N to an analysis filter bank, 160, comprising a plurality of delays, 163, arranged in parallel and varying from 0 to N−1 sampling periods, in reverse order of the delays 137. The flow of samples from the various delays are then decimated by a factor M=N/2 by the decimators 165 and then filtered by the analysis filters 167. The analysis filters have a conjugated pulse response reversed in time relative to the corresponding synthesis filter. Since the prototype filter has real values and is symmetric by time inversion, it can be shown that the pulse response of an analysis filter is the same as that of the corresponding synthesis filter. The combination of a synthesis filter with the corresponding analysis filter (product of transfer functions) gives a Nyquist filter.

An FFT (Fast Fourier Transform) of size N in 170 is then applied to symbols output from synthesis filters, the different frequency components of the FFT then being input into the postprocessing module 180 performing processing in reverse of that of the preprocessing module 110.

The FBMC system shown in FIG. 1 is referred to in the literature as PPN-FBMC (PolyPhase Network FBMC) because of the polyphase filter bank it uses.

Furthermore, MIMO (Multiple Input Multiple Output) type spatial diversity telecommunications systems are known in the state of the art, which use a plurality of antennas at the transmitter and a plurality of antennas at the receiver. These systems allow throughputs to be obtained which are substantially higher than conventional SISO (Single Input Single Output) systems.

The MIMO-OFDM systems combine the advantages of spatial diversity and of OFDM modulation, namely high throughputs with low levels of inter-symbol interference (151). When the channel characteristics, or CSI (Channel State Information), are known to the transmitter, the latter can carry out linear precoding in order to transmit a plurality of streams on virtual channels whilst minimising the between-stream interference, or MSI (Multi-Stream Interference). In general, the purpose of linear precoding is to distribute data streams destined for one or more users, over a plurality of spatial modes and to allocate a transmission power to each of these modes. The number of spatial modes must be less than or equal to the row of the composite channel matrix in question. An example of a precoding technique for a MIMO-OFDM system can be found in the article by E. Auger entitled "Time domain precoding for MIMO-OFDM systems" published in Proc. of 10th International OFDM Workshop, August 2005.

Similarly, FBMC technology has been applied to MIMO-type telecommunications systems, hence known as MIMO-FBMC. MIMO-FBMC systems are, however, substantially more complex than MIMO-OFDM systems due to the fact that FBMC modulation intrinsically uses orthogonality in the complex plane to eliminate inter-symbol interference. The transmission of a plurality of streams in a MIMO-FBMC system has also been envisaged by carrying out linear precoding at the transmitter. Such a precoding method has been described, for example, in the article by F. Horlin et al. entitled "Interference-free SDMA for FBMC-OQAM" published in EURASIP Journal on Advances in Signal Processing 2013, No. 46, pages 1-13. Such precoding is, however, very complex since it requires the application of several precoding matrices per sub-channel in order not only to guarantee separation of streams but also to guarantee the absence of interference between sub-channels.

The aim of the present invention is consequently to propose a transmitter and/or a receiver of an MIMO-FBMC system which implements a particularly simple linear precoding method, whilst guaranteeing separation of data streams and the absence of interference between sub-channels.

BRIEF SUMMARY OF THE INVENTION

The present invention is defined by a MIMO-FBMC transmitter for transmitting a plurality U of data streams on a transmission channel using a plurality $N^T$ of transmission antennas, said transmitter comprising:
- a plurality U of OQAM modulators associated with the U data streams, each modulator receiving a stream data vector and supplying a vector of N alternating real and imaginary components for N sub-channels;
- a plurality U of filtering and spectral spreading modules associated with the U modulators, each filtering and spectral spreading module spreading each component over 2K−1 adjacent sub-carriers and filtering them using the prototype filter transfer function, where K is the overlap factor, in order to supply KN spread and filtered components;
- a plurality KN of linear precoders, associated respectively with the KN sub-carriers, each linear precoder multiplying the spread and filtered components relating to a sub-carrier (j) by a precoding matrix ($P_j$) in order to supply a plurality KN of precoded vectors;
- a plurality ($N^T$, $N^B$) of IFFT modules each receiving elements with the same index as the precoded vectors, where each IFFT module supplies a time signal which represents an FBMC symbol;
- a plurality ($N^T$, $N^B$) of FBMC symbol combination modules in the time domain, associated, respectively, with the IFFT modules in order to supply combined time signals;
- a plurality ($N^T$, $N^B$) of modules for translation of frequency to RF band to generate, from said combined time signals, a plurality $N^T$ of antenna signals destined to be transmitted by said transmission antennas.

According to a first embodiment of the invention, said plurality of IFFT modules, said plurality of FBMC symbol combination modules and said plurality of translation to RF band modules are all equal to the plurality $N^T$ of transmission antennas, the antennas signals being generated by translation to RF band of said combined time signals.

In this case, the precoding modules are of size $N^T \times U$.

According to one first embodiment, the number U of data streams is chosen to be equal to the number $N^T$ of transmission antennas, and the precoding matrices associated with the various sub-carriers are respectively equal to the inverse of the matrix of the transmission channel at the frequencies of said sub-carriers.

According to a second embodiment of the invention said plurality of IFFT modules, said plurality of FBMC symbol combination modules and said plurality of translation to RF band modules are all equal to a plurality $N^B$ of beams, said combined time signals translated to RF band by said modules for translation to RF band each being multiplied by a phase-shift vector, with the antennae signals being generated by summing the components of the vectors thus obtained.

In this case, the precoding matrices are of size $N^B \times U$.

According to an example of the second embodiment, the number $N^B$ of beams is chosen to be equal to the number U of data streams, and the precoding matrices associated with the various sub-carriers are respectively equal to the inverse of a product of a matrix ($W_{RF}$) resulting from concatenation of the phase-shift vectors, with the matrix of the transmission channel for the various sub-carriers.

The invention is also defined by a MIMO-FBMC receiver for receiving a plurality U of data streams on a transmission channel using a plurality $N^R$ of reception antennas, said receiver comprising:
- a plurality ($N^R$, $N^B$) of base-band translation modules for translating, to a base band, a plurality of reception signals generated from antenna signals;
- a plurality ($N^R$, $N^B$) of FFT modules of size KN where AT is the number of FBMC sub-channels and K is the overlap factor, for transforming blocks of KN samples of the reception signals translated to base band, into vectors of KN frequency components;
- a plurality KN of linear precoders, respectively associated with KN sub-carriers, each linear precoder multiplying a vector of frequency components at the sub-carrier which is associated with it by a precoding matrix ($V_j$) to supply a plurality KN of precoded vectors of size U;
- a plurality U of filtering and frequency despreading modules, where each module filters and despreads the frequency components of the precoded vectors associated with a sub-carrier to provide a plurality U of filtered and despread component vectors;
- a plurality U of OQAM demodulation modules in order to demodulate, respectively, the U filtered and despread component vectors and to provide U estimated data flows.

According to a first embodiment, said plurality of translation to base-band modules and said plurality of FFT modules are both equal to the plurality $N^R$ of transmission antennae, where the reception signals are identical to the antennae signals.

According to an example of the first embodiment, the number U is chosen to be equal to the number $N^R$ of reception antennae and the precoding matrices ($V_j$) associated with the various sub-carriers are respectively equal to the inverse of the matrix of the transmission channel at the frequencies of said sub-carriers.

According to a second embodiment, said plurality of base-band translation modules and said plurality of FFT modules are equal to a predetermined number $N^B$ of beams, the reception signals being obtained by multiplying all of the antenna signals by $N^B$ phase-shift vectors of size $N^R$ to obtain $N^B$ vectors of phase-shift signals, the components of each vector of phase-shift signals then being summed to provide a reception signal.

In this case, the precoding matrices are of size $N^B \times U$.

According to an example of the second embodiment, the number $N^B$ of beams is chosen to be equal to the number U of data streams, and the precoding matrices associated with the various sub-carriers are respectively equal to the inverse of the product of a matrix ($W_{RF}$) resulting from concatenation of the phase-shift vectors, with the matrix of the transmission channel for the various sub-carriers.

BRIEF DESCRIPTION OF THE DRAWINGS

Other characteristics and advantages of the invention will become clear by reading preferred embodiments of the invention, with reference to the appended figures among which:

FIG. 6 schematically shows a MIMO-FBMC system receiver with linear precoding, according to a first embodiment of the invention;

DETAILED PRESENTATION OF PARTICULAR EMBODIMENTS

In what follows a MIMO-FBMC system will be considered which comprises a transmitter, possesses $N^T$ antennae, and a set of $Q \geq 1$ receivers (or, equivalently, users). Each receiver q possesses a number $N_q^R$ of elementary antennas, where the total number of reception antennas being represented as $$N^R = \sum_{q=1}^{Q} N_q^R.$$

The transmitter transmits a plurality U of streams, shared between the Q receivers, $$U = \sum_{q=1}^{Q} U_q$$

where $U_q$ is the number of streams intended for the receiver q.

A first idea upon which the present invention is based is to use a FBMC system in the frequency domain as described in the document by M. Bellanger et al. entitled "FBMC physical layer: a primer" available at the web site ict-phydyas.org. FBMC systems implemented in the frequency domain make use of spectral spreading which is the reason for their name FS-FBMC (Frequency Spread FBMC).

Figure 1:
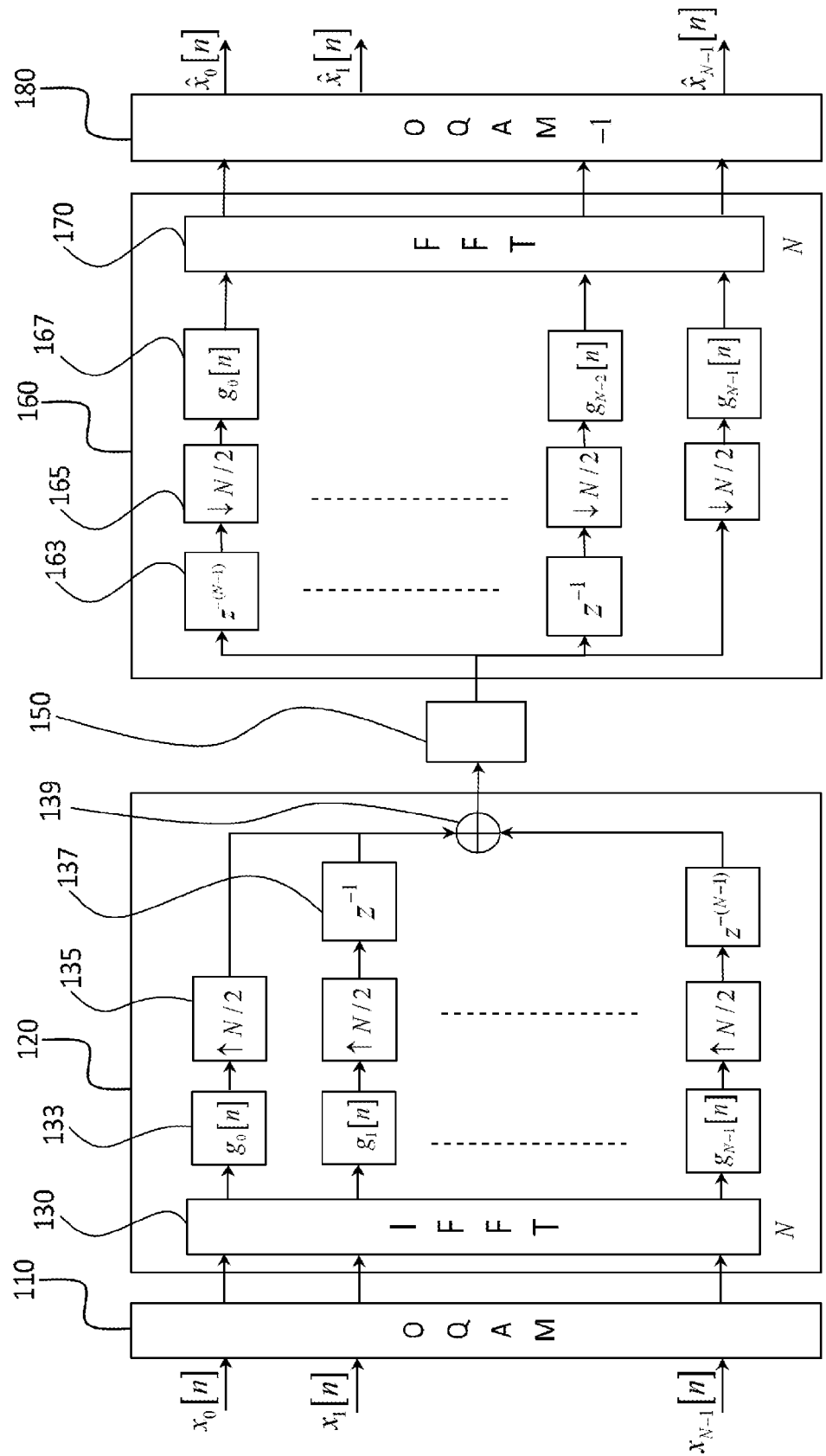
FIG. 1 diagrammatically shows a PPN-FBMC telecommunications system known in the state of the art.
Figure 2:
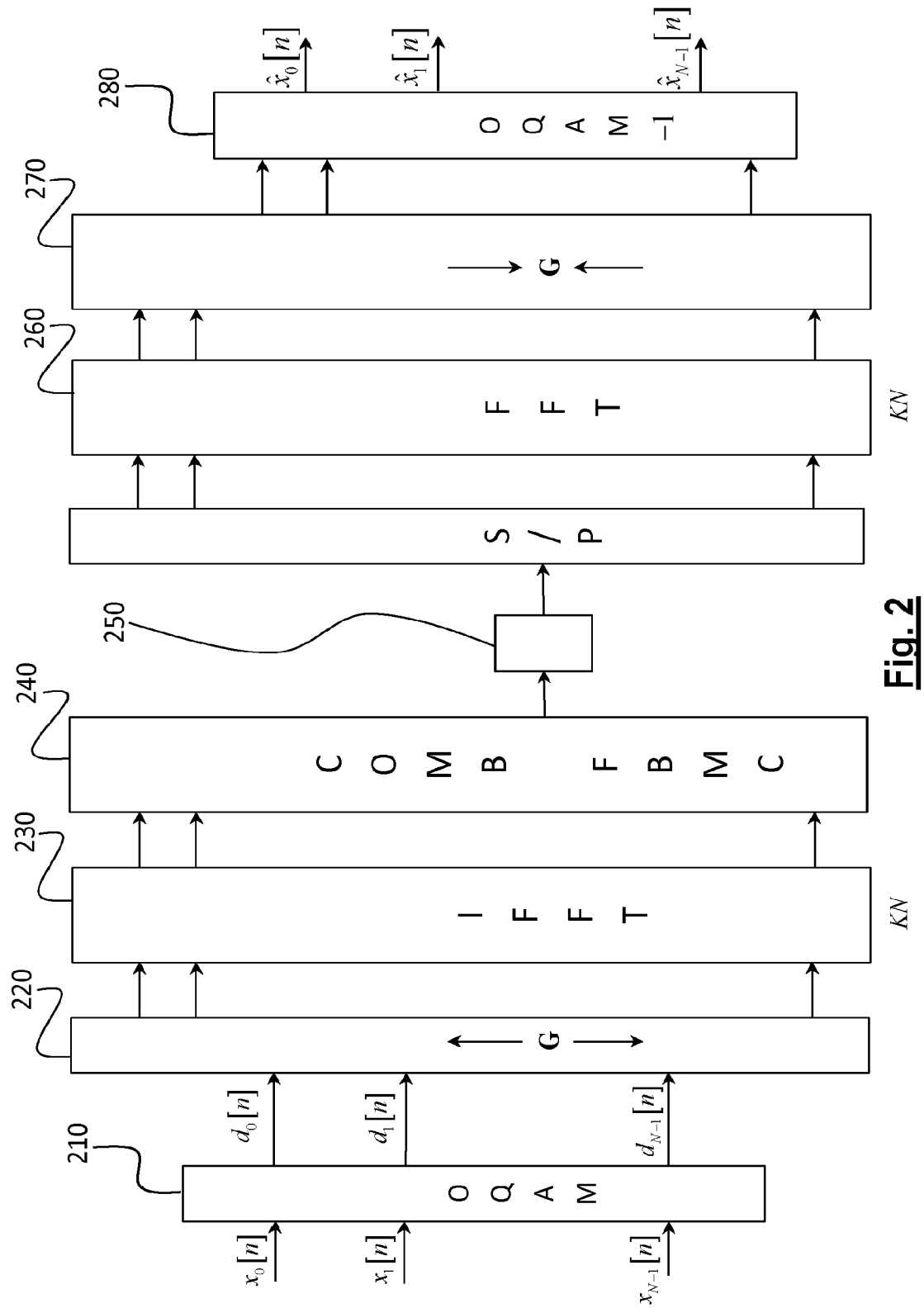
FIG. 2 diagrammatically shows a FS-FBMC telecommunications system.

The structure of such a FS-FBMC system is shown in FIG. 2.

As in the PPN-FBMC system, the QAM modulation symbols to be transmitted at a rate Nf where f=1/T are grouped together into blocks of size N, $x_0[n], \ldots, x_{N-1}[n]$ where n is the block time index. Each block of N symbols is supplied in parallel to N input channels of an OQAM preprocessing module 210.

Each sub-channel is then spread over an interval of 2K−1 adjacent sub-carriers, centred on a central sub-carrier of the sub-channel. More precisely, each item of OQAM data is spread over 2K−1 adjacent sub-carriers and is weighted by the value (real) of the transfer function of the synthesis filter at the corresponding frequency.

220 designates the module for frequency spreading and filtering by the prototype filter. Each item of OQAM data $d_i[n]$ at the input to the module 220 is spread over 2K−1 adjacent sub-carriers to give:

$$d_{i,k}[n] = d_i[n] G_k, k = -K+1, \ldots, 0, \ldots K-1 \quad (1)$$

Figure 3:
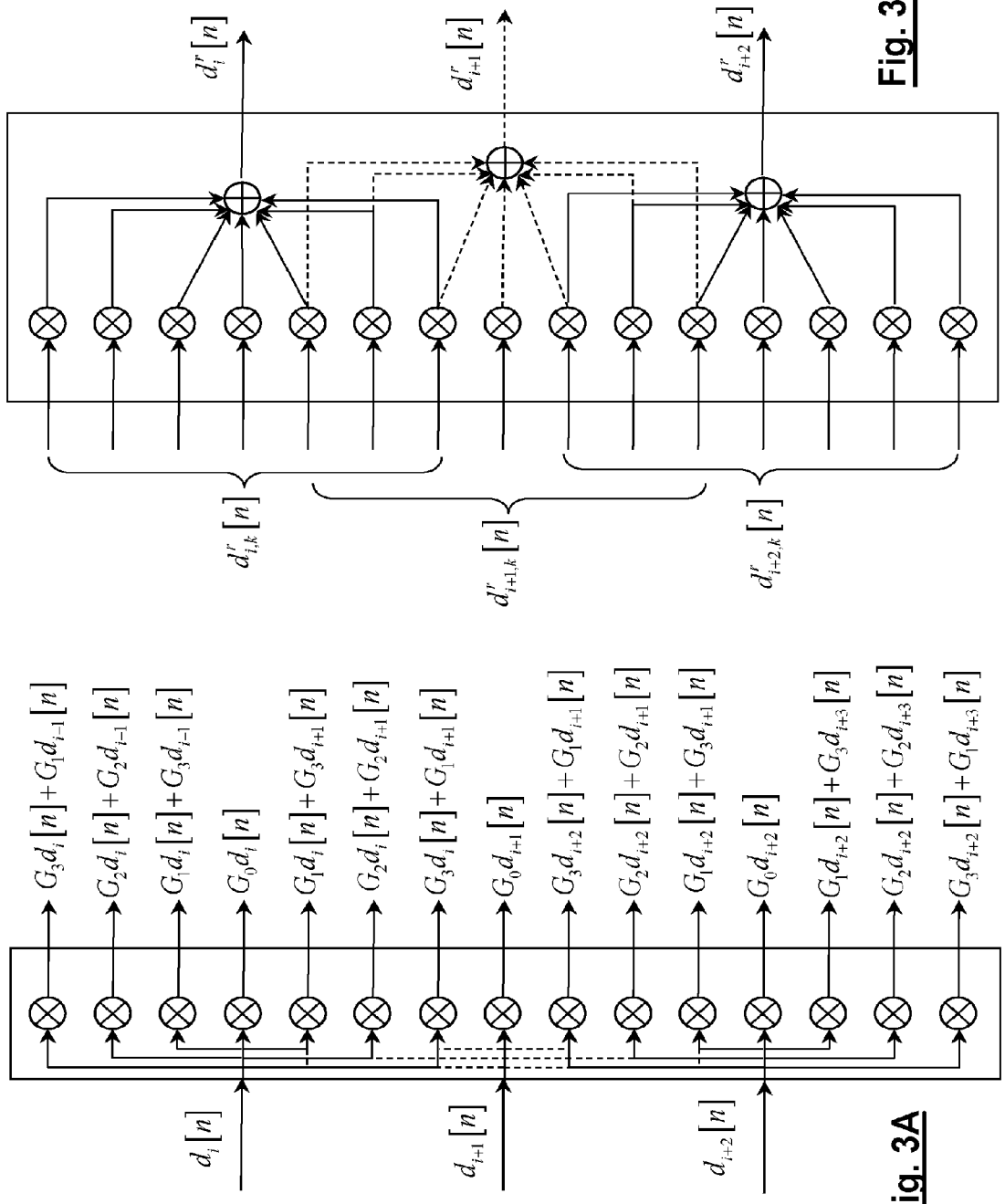
FIG. 3A shows the spectral spreading performed upstream of the IFFT module in FIG. 2.
FIG. 3B shows the spectral despreading performed downstream of the FFT module in FIG. 2.

Data with the same parity i and i+2 are spectrally separated and data with opposite polarities i and i+1 overlap as shown in FIG. 3A. This overlap does not however generate any interference since two items of data with opposite polarities are necessarily located on the real axis and the imaginary axis respectively and are separated by T/2. For example, in FIG. 3A, the items of data $d_i[n]$ and $d_{i+2}[n]$ are real values (represented by continuous lines) whereas data item $d_{i+1}[n]$ is an imaginary value (represented by dashed lines). Imaginary values are presented to the input of the IFFT module with an offset of T/2 relative to the real values. Orthogonality in the complex plane is preserved by filtering with the prototype filter, given that the coefficients $G_k$ are real.

Frequency spread and filtered data are then processed by an IFFT with size KN in 230.

Figure 4:
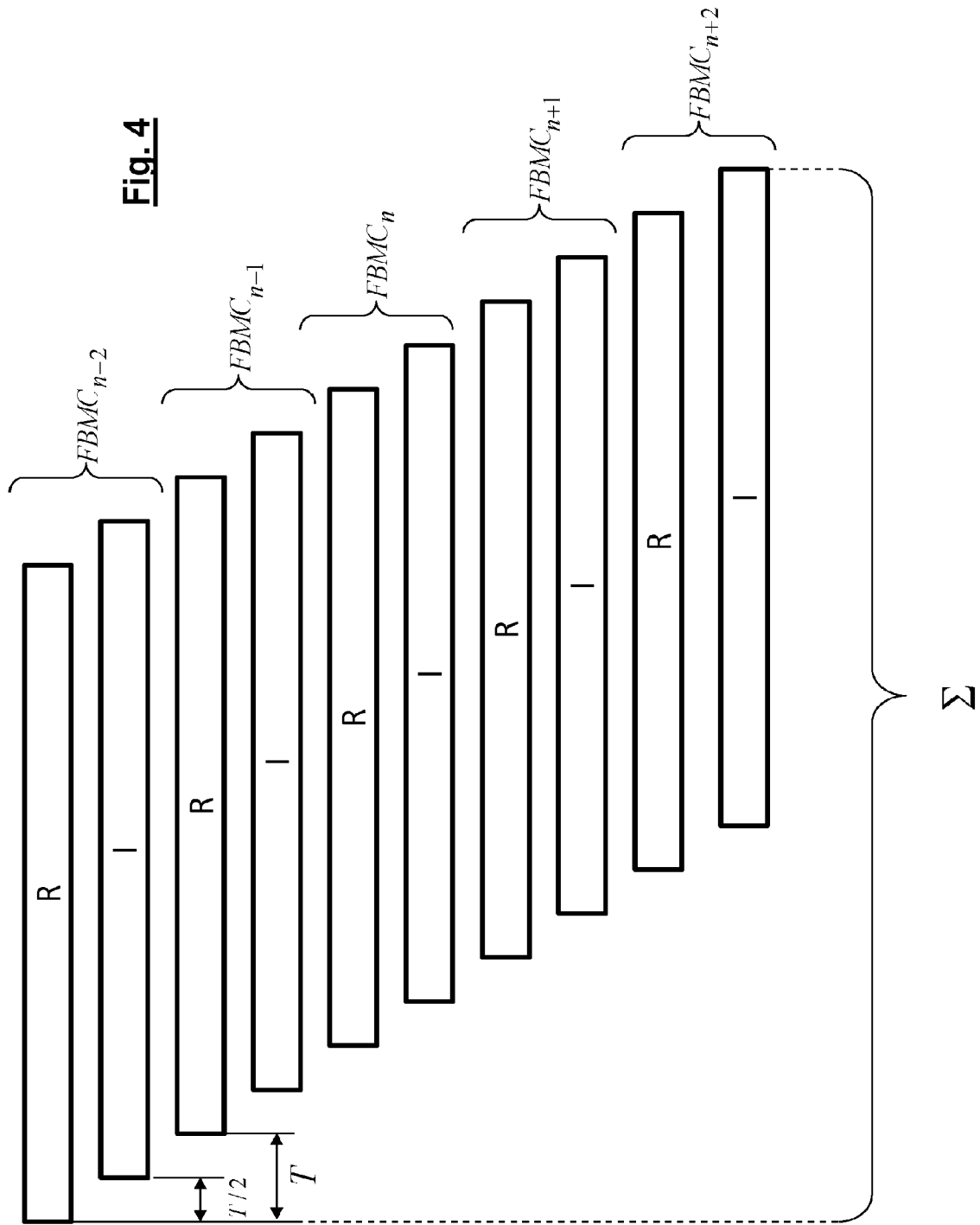
FIG. 4 illustrates the combination of FBMC symbols in FIG. 2.

The block of time samples at the output from IFFT is combined using the combination module 240 as indicated in FIG. 4. All of the samples at the output from the IFFT represent an FBMC symbol in the time domain, where two successive FBMC symbols are offset by T/2 (in other words by N/2 samples) and where each FBMC symbol has a duration KT (in other words a size of KN samples). An FBMC symbol is combined in module 240 with the preceding K−1 FBMC symbols and the following K−1 FBMC symbols. It will be noted that a sample at the output from the combination module 240 is the sum of 2K−1 samples of consecutive FBMC symbols.

The signal thus obtained is then translated to an RF band.

After transmission on channel 250, the received signal, demodulated to base band, is sampled by the receiver at rate Nf and is then converted into blocks of size KN by the series-parallel converter 260.

A sliding FFT (the FFT window sliding by N/2 samples between two FFT calculations) of size KN is carried out in the FFT module, 270, on blocks of KN consecutive samples at the output from the series-parallel converter 260.

The outputs from the FFT then undergo filtering and spectral despreading in module 280. The despreading operation takes place in the frequency domain as shown in FIG. 3B. More precisely, the samples $\check{d}_{i,k}^r[n]$, k=−K+1, . . . , 0, . . . K−1 corresponding to the 2K−1 frequencies (i−1)K+1, . . . iK, . . . (i+1)K−1 of the FFT are multiplied by values of the transfer function of the analysis filter (translated in frequency from that of the prototype filter) at the frequencies concerned and the results obtained are then summed, to give:

$$d_i^r[n] = \sum_{k=-K+1}^{K-1} G_k \check{d}_{i,k}^r[n] \qquad (2)$$

where the values $G_k$, k=−K+1, . . . , K−1 are the values of the prototype filter transfer function at the frequencies of the sub-carriers involved.

It will be seen that as shown in FIG. 3A, data from rows with the same parity, for example $d_i^r[n]$ and $d_{i+2}^r[n]$, are obtained using non-contiguous sample blocks whilst data from two consecutive rows with opposite polarities overlap. Thus the data item $d_{i+1}^r[n]$ is obtained using samples $\check{d}_{i,k}^r[n]$, k=1, . . . , K−1 as well as samples $\check{d}_{i+2,k}^r[n]$, k=−K+1, . . . , −1.

Real data despreading is represented by continuous lines while imaginary data despreading is represented by dashed lines.

The data $d_i^r[n]$ thus obtained are then input to a post-processing module 280, performing the inverse processing to that done in module 210, in other words an OQAM demodulation. The QAM symbols are thus restored.

A second idea upon which the present invention is based is carrying out the precoding in the frequency domain, after spectral spreading and before IFFT, at a stage where the KN sub-carriers are not interlaced.

Figure 5:
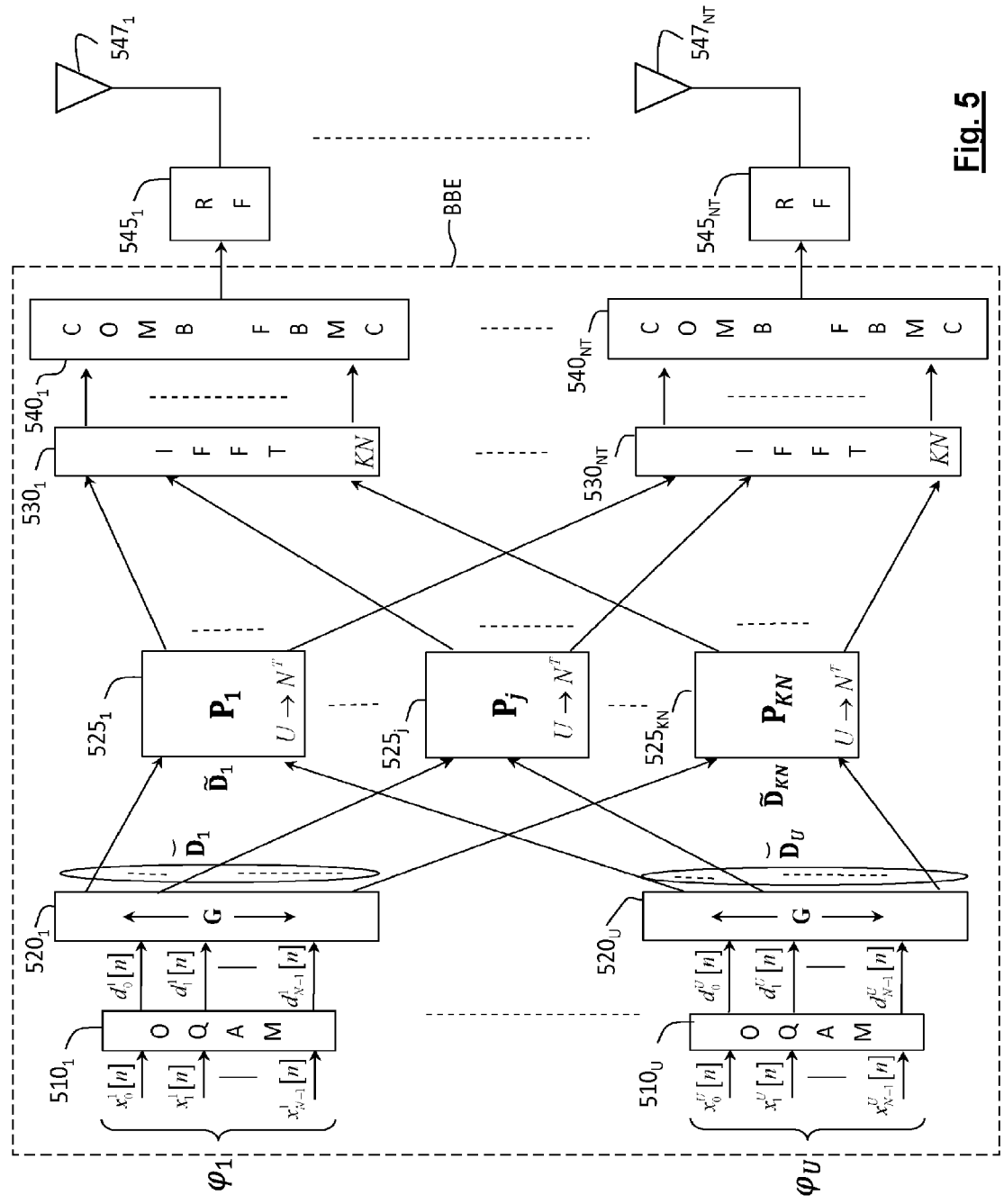
FIG. 5 schematically shows a MIMO-FBMC system transmitter with linear precoding, according to a first embodiment of the invention.

FIG. 5 schematically shows a MIMO-FBMC system transmitter with linear precoding, according to a first embodiment of the invention.

The transmitter receives as input U data streams intended for Q users, each stream, $\varphi_u$, u=1, . . . , U taking the form of a sequence of blocks of size N, $x_0^u[n], \ldots, x_{N-1}^u[n]$. Each stream $\varphi_u$ is modulated by an OQAM modulator, $510_u$, u=1, . . . , U, identical to the processing module 210. Each element of the data vector $d_i^u[n]$, i=1, . . . , N at the output from the modulator $510_u$ is spread over 2K−1 adjacent sub-carriers in the spectral spreading and filtering module by the prototype filter, $520_u$, which is identical to module 220, described previously. The frequency spread and filtered data, $\check{d}_{i,k}^u[n] = d_i^u[n]G_k$, takes the form of a vector $\check{D}_u[n]$ of KN samples which correspond to the KN sub-carriers.

The KN linear precoders $525_1, \ldots, 525_{KN}$ correspond respectively to the KN sub-carriers. This precoder $525_j$ receives elements with index j (carried by sub-carrier j) of vectors $\check{D}_u[n]$, u=1, . . . , U. The operation carried out by precoder $525_j$ consists of multiplying the input vector, $\tilde{D}_j[n]$ of size U formed by elements $\check{D}_u(j)[n]$, u=1, . . . , U, corresponding to sub-carrier j, by a matrix $P_j$ of size $N^T \times U$ defined later, the same matrix $P_j$ is applied for all vectors $\check{D}_j$ (and therefore to all data $d_i^u[n]$) of a given frame. Thus, at the output, KN precoded vectors $P_j\tilde{D}_j[n]$ of size $N^T$ are obtained. The elements of the precoded vectors are then supplied to a battery of IFFT modules, $530_l$, l=1, . . . ,$N^T$, each IFFT module being associated with an antenna of the transmitter. The IFFT module, $530_l$, receives a vector made up of elements of index l of the KN precoded vectors and performs an IFFT of size KN on this vector.

The successive time sample blocks at the output from these IFFT modules then undergo a combination operation in the combination modules $540_l$, l=1, . . . ,$N^T$, each module $540_l$ being identical to the module 240 described previously.

The signals at the output from the combination modules are then respectively translated to the RF band in $545_l$, l=1, . . . , $N^T$, then amplified before being transmitted by the $N^T$ transmitter antennas $547_l$, l=1, . . . , $N^T$.

FIG. 6 schematically shows a MIMO-FBMC system receiver with linear precoding, according to a first embodiment of the invention.

The receiver is equipped with $N_q^R$ antennae, with the signals received by the various antennae being translated to base band and sampled at the frequency Nf. For each antenna, the samples are converted to blocks of size KN. Thus the series-parallel converters $660_p$, p=1, . . . , $N_q^r$, form blocks of KN samples and supply them to the FFT modules, $670_p$, p=1, . . . ,$N_q^r$. These FFT modules perform a sliding FFT of size KN, with a slide of N/2, samples between two successive calculations, as described in relation to module 270.

The frequency samples at the output from the FFT modules are then transmitted to KN linear precoders, $675_j$, j=1, . . . , KN, each corresponding to a sub-carrier. Thus the precoding module $675_j$ receives the $N_q^r$ index elements j (sub-carrier j) of the frequency sample vectors at the output from the FFT modules and multiplies this vector of size $N_q^r$ by a precoding matrix $V_q$ of size $U_q \times N_q^r$. The KN vectors at the output of the linear precoders, $675_j$, j=1, . . . ,KN, of size $U_q$ are then transmitted to the $U_q$ filtering and spectral despreading modules $680_u$, u=1, . . . ,$U_q$, with each operating like the module 280 described previously. More precisely, each module $680_u$, corresponding to a stream, receives the KN samples of index u of the output vectors of the modules $675_j$, j=1, . . . ,KN. The $U_q$ filtered and spectrally despread vectors at the output from these modules are then respectively supplied to $U_q$ OQAM demodulation modules M, $690_u$, u=1, . . . ,$U_q$, to provide the data from the various user streams.

It will be noted that the number of linear precoders $525_j$ and $675_j$ is KN, with each linear precoder being associated with a sub-carrier. Those skilled in the art, however, will understand that if the channel is of the flat fading or block fading type, the number of linear precoders may be reduced and the precoding multiplexed over time upstream of the IFFT on the transmitter side and downstream of the IFFT on the receiver side.

In general, precoding can be implemented at the transmitter (first alternative) or at the receiver (second alternative) or even at the transmitter and at the receiver. Various embodiment examples may also be envisaged according to the distribution of streams between the users.

It can be assumed, first of all, according to a first alternative, that the precoding is only implemented on the transmitter side. The architecture of the transmitter is then that of FIG. 5.

Figure 7B:
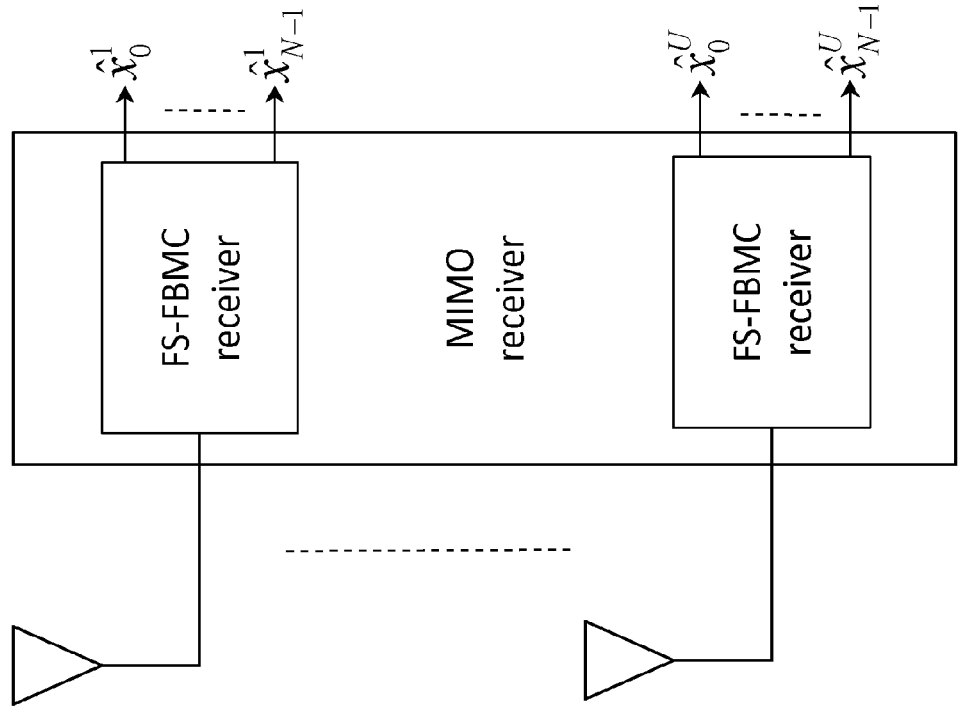
FIGS. 7A and 7B schematically show first and second receiver examples in the case where the MIMO-FBMC transmitter is that of FIG. 5.
Figure 7A:
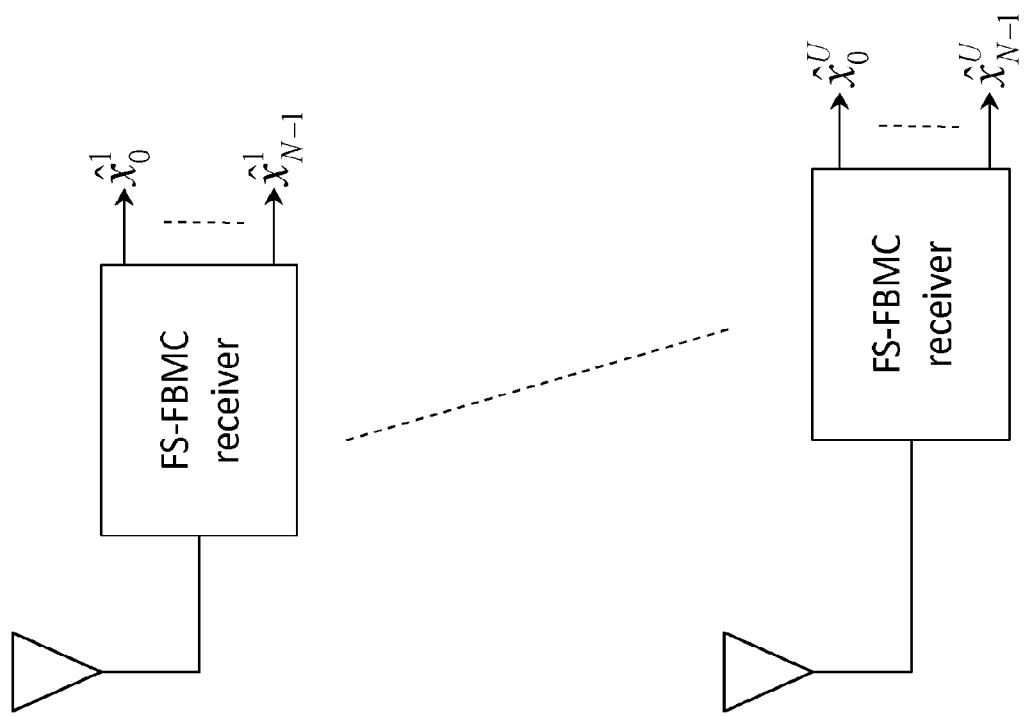

In a first example, $U=Q$, $N^T=U$, $U_q=1$, $N_q^R=1$, $q=1, \ldots, Q$, in other words the transmitter transmits one stream per user (example of the so-called MU-MIMO or Multi User MIMO mode), with no separation of stream taking place at the receivers (in other words the matrices $V_q$, $q=1, \ldots, Q$ are reduced to a scalar value 1). The receivers according to this example are shown in FIG. 7A: each user is then equipped with a FS-FBMC receiver like that described in relation to the right hand portion of FIG. 2.

In a second example, $Q=1$, $N^T=U$, $N^R=U$, in other words the transmitter transmits all the streams to a single user who possesses U antennas (example of the so-called SU-MIMO or Single User MIMO mode). The user has U independent elementary FS-FBMC receivers (identical to those described in relation to the right-hand portion of FIG. 2), where each elementary FS-FBMC receiver is associated with one of the user's antennae, as shown in FIG. 7B.

According to a second alternative, the precoding is fully implemented on the receiver side, in other words the separation of streams is carried out at the receiver. The architecture of the receiver is then that of FIG. 6.

Figure 8B:
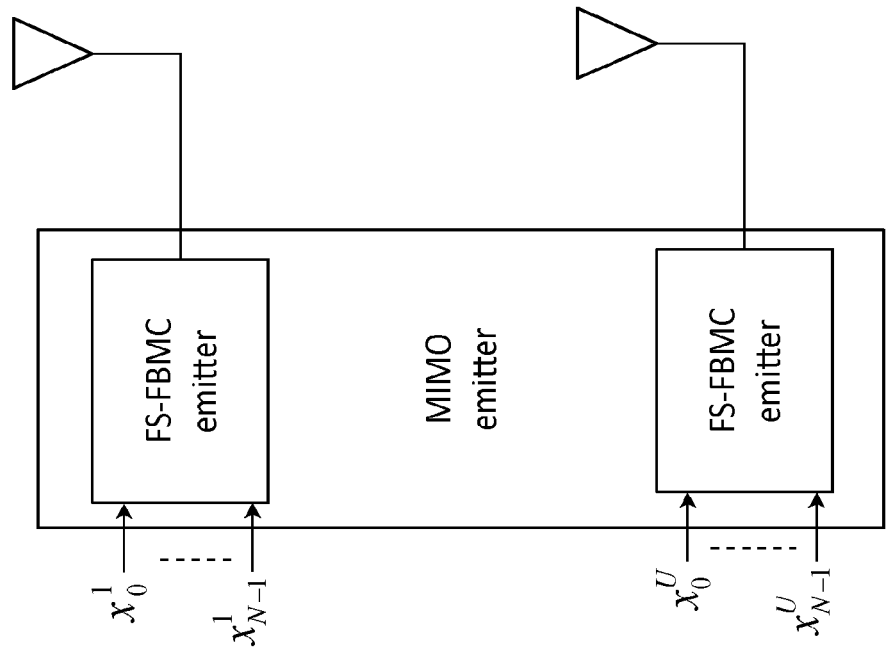
FIGS. 8A and 8B schematically show first and second MIMO-FBMC transmitter examples in the case where the receiver is that of FIG. 6.
Figure 8A:
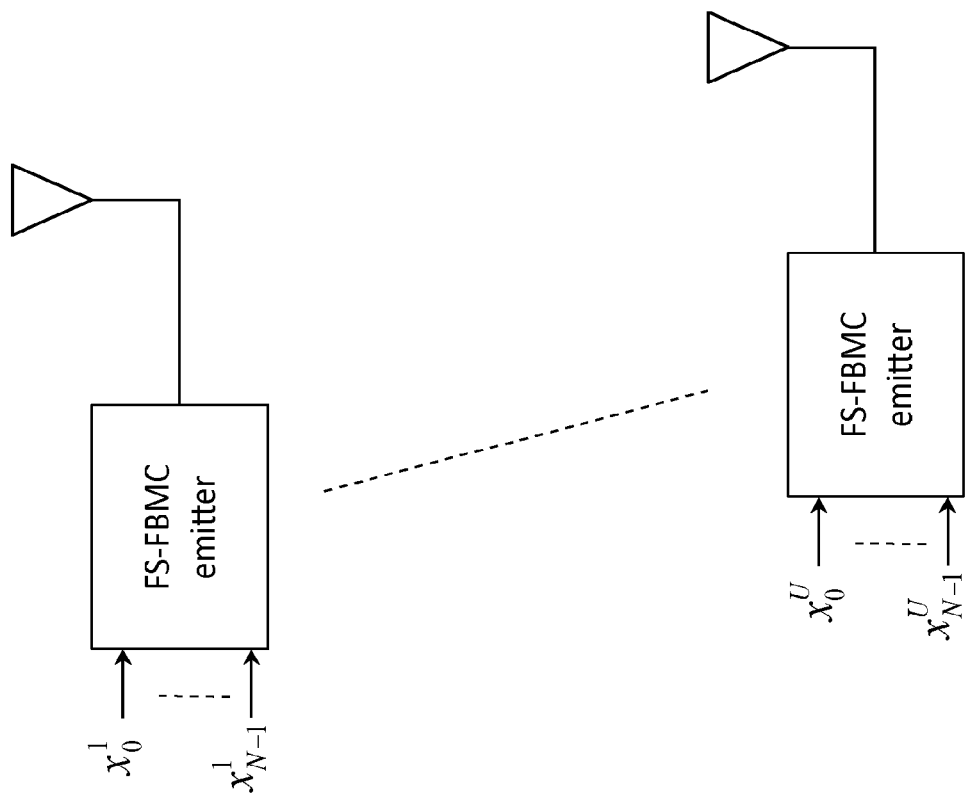

In a first example, $N^T=1$, $U_q=1$, $N^R=U$, in other words the MIMO-FBMC system is made up of U FS-FBMC transmitters each possessing one antenna, as shown in FIG. 8A, and a receiver comprising U antennae. The transmitters then have the structure of an FS-FBMC transmitter, as described in relation to the left hand portion of FIG. 2.

In a second example, $Q=1$, $N^T=U$, $N^R=U$, in other words the MIMO-FBMC system is made up of a transmitter which possesses U antennas and a receiver which also possesses U antennas. The transmitter comprises U independent elementary FS-FBMC transmitters, where each elementary transmitter is associated with an antenna, as illustrated in FIG. 8B.

Without any loss of generality, the benefits of carrying out the precoding downstream of the OQAM modulation and of the spectral spreading, and upstream of the IFFT, will be shown in the case of the first alternative.

The signal received on the carrier j on the U antennae (belonging to different users in the first example and to distinct users in the second example) may be expressed in the form of a column-vector $r_j[n]$ of size U:

$$r_j[n] = H_j\left(P_j D_j[n] + \sum_{n_k=n-(2K-1)}^{n+(2K-1)} P_j D_j[n_k]\right) + N_j[n] \quad (3)$$

$$= H_j P_j\left(D_j[n] + \sum_{n_k=n-(2K-1)}^{n+(2K-1)} D_j[n_k]\right) + N_j[n]$$

where the sum is performed on all interfering symbols, depending on the response of the prototype filter, $N_j$ is an additive noise vector and $H_1$ is the channel matrix of size $U \times U$ relative to sub-carrier j.

For example $P_j = H_j^{-1}$ could be chosen as a precoding matrix (precoding according to a criteria ZF), and thus:

$$r_j[n] = D_j[n] + \sum_{n_k=n-(2K-1)}^{n+(2K-1)} D_j[n_k] \quad (4)$$

here neglecting the noise term. It can be seen that precoding does not introduce additional interference relative to a conventional FBMC system (without precoding) and that the interference terms are therefore eliminated simply by the OQAM demodulation, due to the orthogonality of the interference and of the data in the complex plane.

On transmission, the fact that precoding is performed before the IFFT and combination in the time domain means that no additional interference is introduced relative to a conventional FBMC system. Similarly, the fact that precoding is performed after the FFT, and therefore in the frequency domain, means that no additional interference is introduced.

The linear precoding in the base band, at transmission and/or reception, can be combined with a beamforming in the RF band. It will be recalled that the purpose of precoding is to create virtual channels. The maximum number of virtual channels is equal to the rank of the composite channel matrix, here a block matrix of size $N \times N^T \times N^R$ where N is the number of carriers, $N^T$ is the number of transmission antennas and $N^R$ is the number of reception antennas of the system. These virtual channels can be spatially separated by directing them in appropriate directions. For example, if it is assumed that the MIMO-FBMC transmitter is located at a base station and that the MIMO-FBMC receivers are located in the MIMO-FBMC terminals, the streams destined for a given terminal may be directed towards this terminal whilst forming a transmission beam. In a reciprocal manner, beams can be formed at reception in the direction of the terminals whose streams it is wished to receive. This therefore avoids sending or receiving streams to/coming from terminals not concerned by the latter, which reduces the inter-stream interference.

Figure 9:
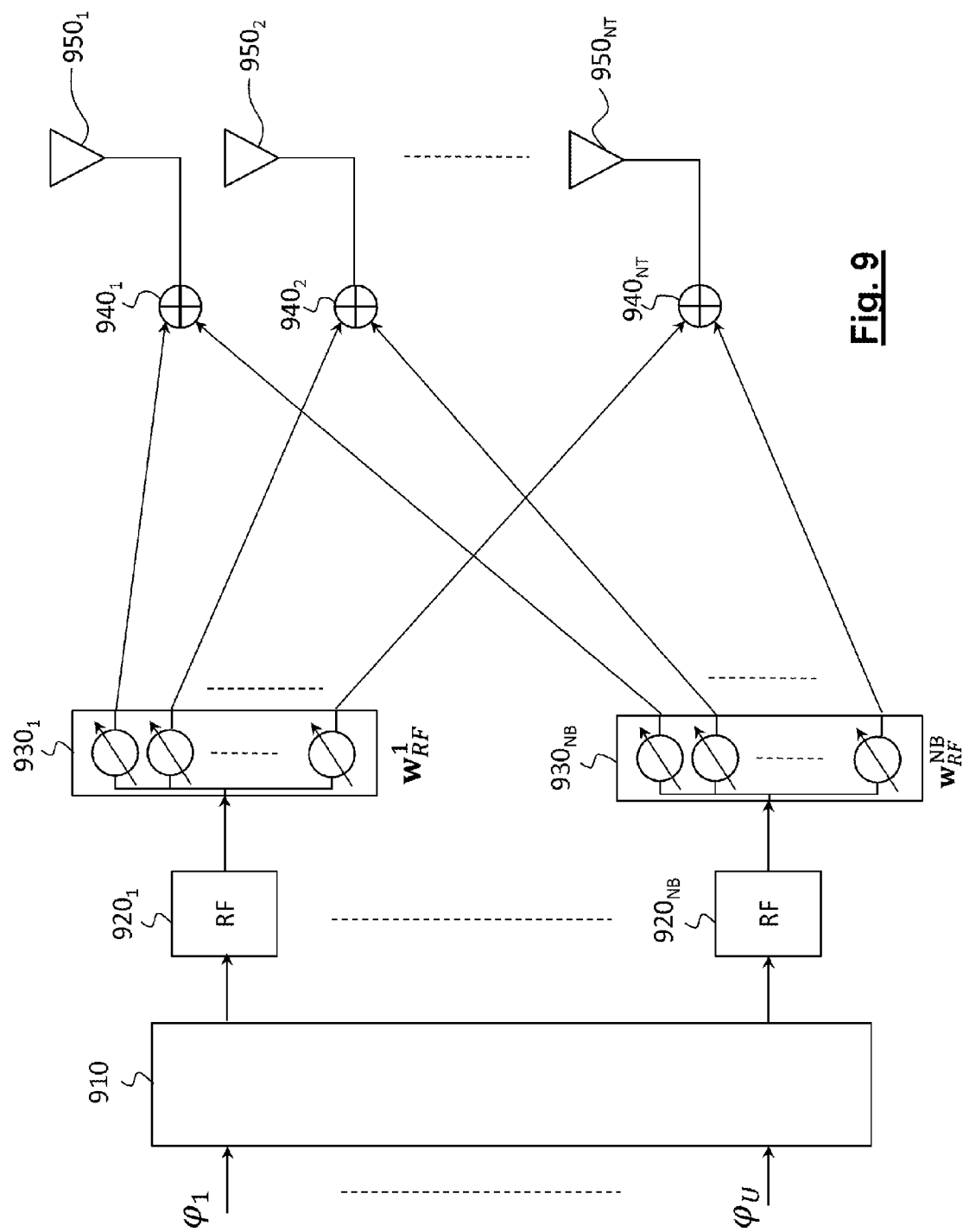
FIG. 9 schematically shows a MIMO-FBMC system transmitter with linear precoding and formation of beams at transmission, according to a second embodiment of the invention.

FIG. 9 schematically shows a MIMO-FBMC system transmitter with linear precoding and beamforming at transmission, according to a second embodiment of the invention.

It has been assumed in FIG. 5 that the MIMO-FBMC transmitter must transmit U streams $\varphi_1, \ldots, \varphi_U$. The various streams are processed in the base band by the module 910, which is identical to the assembly designed by base band emitter (BBE) in FIG. 5, except that the precoding matrices $P_j$, $j=1, \ldots, KN$ are of size $N^B \times U$ instead of being of size $N^T \times U$ where $N^B$ is the number of beams. The base band signals coming from the FBMC combination modules and intended for the various beams are respectively translated to RF band by RF modules $920_1, \ldots, 920_{N^B}$. The RF signals thus obtained are respectively multiplied in $930_b$, $b=1, \ldots, N^B$ by $N^B$ phase-shift vectors of size $N^T$, $w_{RF}^b$, $b=1, \ldots, N^B$. The elements of the phase-shift vector $w_{RF}^b$ introduce phase-shifts into the RF signal supplied by the module $920_b$ such that it is transmitted in the direction of the beam $^b$. Where necessary, these elements also introduce a weighting of the RF signal on the various antenna so as to reduce the secondary lobes of the beam generated.

The signals of the various beams coming from multipliers $930_b$, $b=1, \ldots, N^B$ are summed in $940_1, \ldots, 940_{N^T}$ to form $N^T$ antenna signals which are respectively transmitted by the antennae $950_1, \ldots, 950_{N^T}$.

In the case where the number $N^B$ of beams is chosen to be equal to the number U of streams, the precoding matrices are of size U×U. The precoding matrix $P_j$ relating to the sub-carrier j can be calculated to be $(H_j W_{RF})^{-1}$ where $W_{RF}$ is the matrix of size $N^T \times N^B$ resulting from the concatenation of vectors $w_{RF}^b$, b=1, ..., $N^B$.

Figure 10:
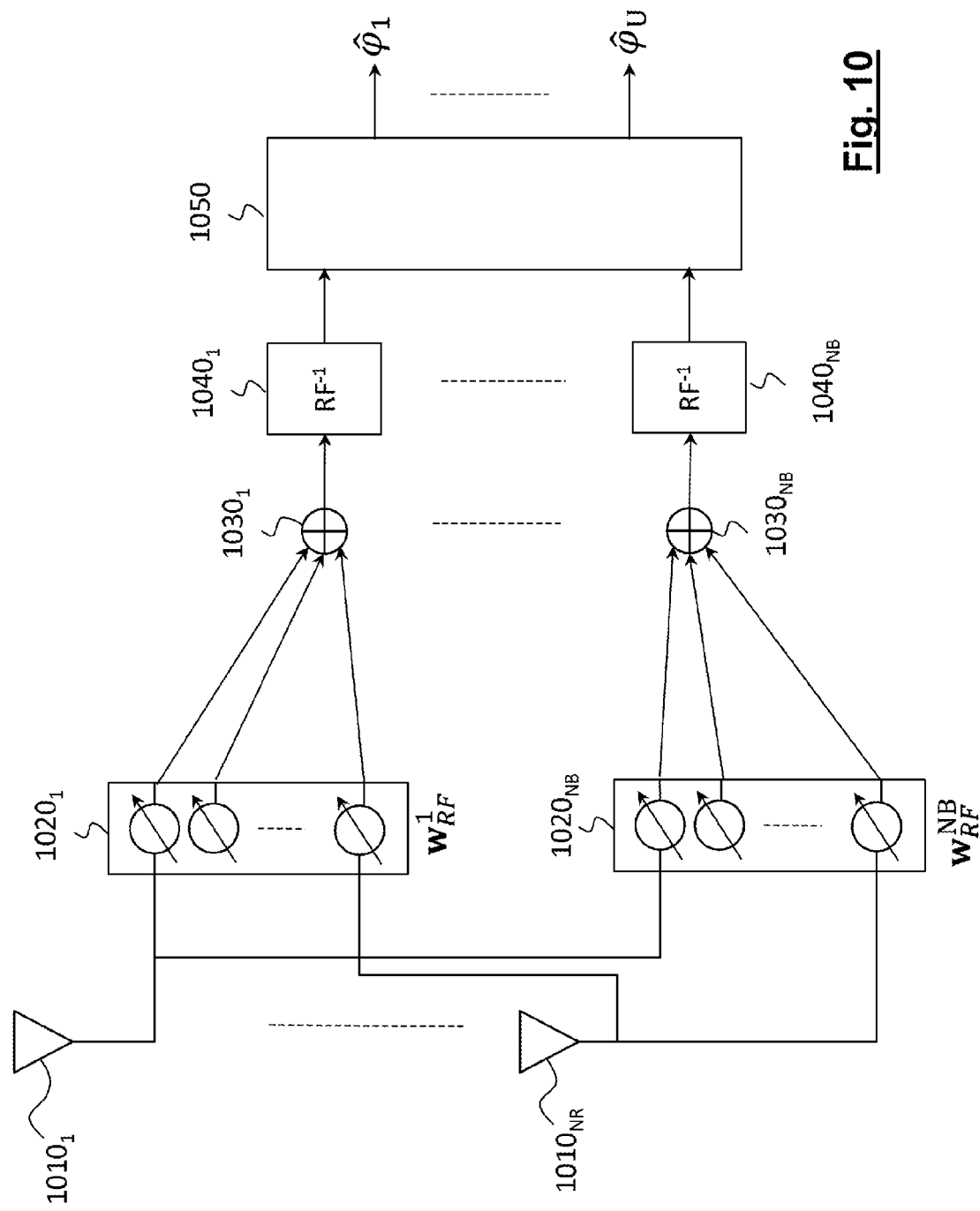
FIG. 10 schematically shows a MIMO-FBMC system receiver with linear precoding and formation of beams at reception, according to a second embodiment of the invention.

FIG. 10 schematically shows a MIMO-FBMC system transmitter with linear precoding and beamforming at reception, according to a second embodiment of the invention.

It has been assumed here that the MIMO-FBMC receiver possessed $N^R$ reception antennas, $1010_1$, ..., $1010_{N^R}$, and was intended to receive U data streams. The antennas signals are multiplied by phase-shift vectors $w_{RF}^b$, b=1, ..., $N^B$ in $1020_1$, ..., $1020_{N^B}$. The phase-shift vector elements $w_{RF}^b$ introduce phase shifts into the antenna signals so as to form a beam b on reception. The elements of $w_{RF}^b$ may also weight the various antenna signals so as to reduce the secondary lobes of the beam formed at reception.

The signals thus multiplied are then summed in $1030_1$, ..., $1030_{N^B}$ to generate $N^B$ beam signals at reception. These beam signals are the processed by the base band processing module 1050, which is identical to the base band receiver (BBR) module of FIG. 6, except only that the precoding matrices $V_j$, j=1, ..., KN, are here of size $N^B \times U$. The base band processing module 1050, and more specifically the OQAM demodulators that it contains, therefore supply the estimated data streams, $\hat{\varphi}_1, \ldots, \hat{\varphi}_U$.

Those skilled in the art will understand that the second embodiment further reduces interference between streams (MSI) by spatially separating them. Irrespective of the embodiment, the present invention allows significant throughputs to be achieved, whilst retaining the intrinsic advantages of FBMC modulation, namely good out-of-band rejection and good spectral efficiency.

The invention claimed is:

1. A Multiple Input Multiple Output Filter Bank Multi-Carrier (MIMO-FBMC) transmitter for transmitting a plurality U of data streams on a transmission channel using a plurality $N^T$ of transmission antennas characterised in that it comprises:
   a plurality U of Offset Quadrature Amplitude Modulation (OQAM) modulators associated with the U data streams, each modulator receiving a stream data vector and supplying a vector of N alternating real and imaginary components for N sub-channels, where N is equal to an integer greater than 1
   a plurality U of filtering and spectral spreading modules associated with the U modulators, each filtering and spectral spreading module spreading each component over 2K−1 adjacent sub-carriers and filtering them using a prototype filter transfer function, where K is the overlap factor equal to an integer greater than 1, in order to supply KN spread and filtered components that represent KN subcarriers;
   a plurality KN of linear precoders, associated respectively with the KN sub-carriers, each linear precoder multiplying the spread and filtered components relating to a sub-carrier (j) by a precoding matrix ($P_j$) in order to supply a plurality KN of precoded vectors;
   a plurality ($N^T$) of inverse Fast Fourier Transform (IFFT) modules each receiving elements with the same index as the precoded vectors, where each IFFT module supplies a time signal which represents an FBMC symbol;
   a plurality ($N^T$) of FBMC symbol combination modules in the time domain, associated respectively with the IFFT modules in order to supply combined time signals;
   a plurality ($N^T$) of modules for translation of frequency to radio frequency (RF) band to generate, from said combined time signals, a plurality $N^T$ of antenna signals destined to be transmitted by said transmission antennas.

2. The MIMO-FBMC transmitter according to claim 1 characterised in that a number of said plurality of IFFT modules, a number of said plurality of FBMC symbol combination modules and a number of said plurality of translation to RF band modules are all equal to the number $N^T$ of transmission antennas, the antenna signals being generated by translation to the RF band of said combined time signals.

3. The MIMO-FBMC transmitter according to claim 2, characterised in that the precoding matrices are of size $N^T \times U$.

4. The MIMO-FBMC transmitter according to claim 3, characterised in that, the number U of data streams is chosen to be equal to the number $N^T$ of transmission antennas, and that the precoding matrices associated with the various sub-carriers are respectively equal to the inverse of the matrix of the transmission channel at the frequencies of said sub-carriers.

5. The MIMO-FBMC transmitter according to claim 1, characterised in that a number of said plurality of IFFT modules, a number of said plurality of FBMC symbol combination modules and a number of said plurality of RF band translation modules are all equal to a number $N^B$ of beams, said combined time signals translated to RF band by said modules for translation to RF band each being multiplied by a phase-shift vector, with the antenna signals being generated by summing the components of the vectors thus obtained.

6. The MIMO-FBMC transmitter according to claim 5, characterised in that the precoding matrices are of size $N^B \times U$.

7. The MIMO-FBMC transmitter according to claim 6, characterised in that the number $N^B$ of beams is chosen to be equal to the number U of data streams, and the precoding matrices associated with the various sub-carriers are respectively equal to the inverse of the product of a matrix ($W_{RF}$) resulting from concatenation of the phase-shift vectors, with the matrix of the transmission channel for the various sub-carriers.

8. A Multiple Input Multiple Output Filter Bank Multi-Carrier (MIMO-FBMC) receiver for receiving a plurality U of data streams on a transmission channel using a plurality $N^R$ of reception antennas characterised in that it comprises:
   a plurality ($N^R$) of Fast Fourier transform (FFT) modules of size KN where N is the number of FBMC sub-channels equal to an integer greater than 1 and K is the overlap factor equal to an integer greater than 1, for transforming blocks of KN samples of reception signals generated from antenna signals and translated to a base band, into vectors of KN frequency components;
   a plurality KN of linear precoders, respectively associated with KN sub-carriers, each linear precoder multiplying a vector of frequency components at the sub-carrier which is associated with it by a precoding matrix ($V_j$) to supply a plurality KN of precoded vectors of size U;
   a plurality U of filtering and frequency despreading modules, where each module filters and despreads the frequency components of the precoded vectors associated with a sub-carrier to provide a plurality U of filtered and despread component vectors;
   a plurality U of Offset Quadrature Amplitude Modulation (OQAM) demodulation modules in order to demodulate, respectively, the U filtered and despread component vectors and to provide U estimated data flows.

9. The MIMO-FBMC receiver according to claim 8, characterised in that a number of said plurality of FFT modules is equal to the number $N^R$ of reception antennas, where the reception signals are equal to the antenna signals.

10. The MIMO-FBMC receiver according to claim 9, characterised in that the number U is chosen to be equal to the number $N^R$ of reception antennas, and that the precoding matrices ($V_j$) associated with the various sub-carriers are respectively equal to the inverse of the matrix of the transmission channel at the frequencies of said sub-carriers.

11. The MIMO-FBMC receiver according to claim 8, characterised in that a number of said plurality of FFT modules is equal to a predetermined number $N^B$ of beams, the reception signals being obtained by multiplying all of the antenna signals by $N^B$ phase-shift vectors of size $N^B$ to obtain $N^B$ vectors of phase-shift signals, the components of each vector of phase-shift signals then being summed to provide a reception signal.

12. The MIMO-FBMC receiver according to claim 11, characterised in that the precoding matrices are of size $N^B \times U$.

13. The MIMO-FBMC receiver according to claim 12, characterised in that the number $N^B$ of beams is chosen to be equal to the number U of data streams, and that the precoding matrices associated with the various sub-carriers are respectively equal to the inverse of the product of a matrix ($W_{RF}$) resulting from concatenation of the phase-shift vectors, with the matrix of the transmission channel for the various sub-carriers.

* * * * *